3,437,625
COMPOSITIONS FOR THE CONSOLIDATION
OF SOILS
Bernard Bonnel and Jean Neel, Lyon, France, assignors to
Progil, Paris, France, a corporation of France
No Drawing. Filed Oct. 22, 1965, Ser. No. 502,630
Claims priority, application France, Jan. 26, 1965,
45,546
Int. Cl. B01c 7/36; C08g 9/20
U.S. Cl. 260—29.4                                    5 Claims

ABSTRACT OF THE DISCLOSURE

Improved soil stabilization as obtained by using a composition of (1) an aqueous solution of an alkaline silicate and a gelling agent together with (2) an aqueous solution of a reaction product of formaldehyde and an acrylamide monomer.

---

The present invention relates to a process of stabilizing soils and especially to strengthening clay-like and sandy soils, the surface of which must be resistant to heavy loads and the initial cohesion of which does not allow engineering work such as making underground gallery openings, tunnels, etc.

This invention also relates to new compositions, based on acrylic derivatives and alkaline silicates, intended for use in treating soils.

It has already been proposed to inject into soils for strengthening them various types of poly-electrolytes such as for example: vinyl polyacetate, poly-vinylic alcohol, sulfonated polystyrene, carboxy-alkyl-celluloses, polyacrylamide, sodium poly-acrylate, etc. The prior art has also described the use of polymethylol-acrylamides for this purpose in U.S. Patent 2,898,320. The use of the comonomers: acrylamide-alcoylidene acrylamide, which are polymerized in situ in the soil in the presence of a catalyst has also been proposed (Gnaedinger, Industry and Power, September 1954, pp. 79–81).

Moreover it has been suggested to strengthen soils by adding metal silicates, especially alkaline ones, simultaneously with a gelling agent of a saturated aliphatic acid derivative amide type, such as for example: formamide, acetamide, propionamide, etc. In this case a true chemical reaction takes place between the silicate and its gelling reagent. As is shown in the French Patent 1,298,359, the obtained gels are not stable; they disintegrate in the course of time and are not transformed into cement which is able to consolidate the soil.

The new compositions according to the invention yield on the contrary hard gels, which are insensitive to water, and which induce a stable consolidation of soils sensitive to load.

Other advantages inherent in these compositions will appear during the description hereinbelow.

In its most general form the invention consists in using, as a soil adjuvant, an association of the following compounds:

An aqueous solution of an alkaline silicate added to a convenient gelling reagent;

An aqueous solution of a mixture of formaldehyde and an acrylamide monomer;

One or several catalysts able to induce in situ in the soil the polymerization of the acrylic mixture.

A suitable alkaline silicate able to be used according to the invention may be a sodium or potassium polysilicate or silicate wherein the molecular ratio $SiO_2/M_2O$ is between 2.0 and 5.0, preferably 3.3 to 4.0 (M=K or Na). It is used in the form of an aqueous solution titrating 25 to 40% of dry extract, mixed with a gelling reagent of a known type, as for example triacetin, sodium bicarbonate, ethyl acetate, etc. The gelling agent ratio with regard to silicate (dry extract) can vary between large limits, for example, between 10 and 80% by weight.

The mixture of acrylamide and formaldehyde is obtained by contacting an aqueous solution of acrylamide and an aqueous solution of formaldehyde in the presence of a basic catalyst, as, for example, sodium carbonate or an aqueous solution of sodium hydroxide at a temperature of 20 to 70° C. It is possible to react in that way 0.5 to 1.5 moles of formaldehyde with 1 mole of acrylamide.

The aqueous solution of the mixture obtained can include about 1 to 20%, and preferably 5 to 15% of dry extract. The ratio of formaldehyde to acrylamide, in this extract, can be about 10 to 30% by weight. Before use in compositions according to the invention, this solution is in the form of a homogeneous liquid, the pH of which is between about 6 and 8 (at 20° C.) and has a viscosity of between about 1 and 5 centipoises (at 20° C.).

The catalyst used as the third constituent of the compositions according to the invention may be chosen from conventional polymerization catalysts such as organic peroxides, such as benzoyl peroxide, persalts such as potassium persulfate, Redox systems (for example, alkaline bisulfite/chloric acid) added possibly with water-soluble organic or inorganic acids or also with alkaline agents such as hydroxides or carbonates. Catalyst mixtures may also be used, such as persalts activated by polyamines or organic nitriles such as dialkyl-aminopropionitriles.

The application of these compositions for soil strengthening, according to the invention, may be accomplished in different ways. According to a preferred form of the invention, the composition is introduced in separate containers. In one container there may be the mixture in an aqueous solution of acrylamide, formaldehyde and polymerization catalyst, and in the other container the aqueous solution of alkaline silicate containing its gelling reagent. Then the two mixtures are mixed and after stirring for a convenient time, usually some minutes, the resulting solution is injected in the soil to be stabilized.

According to another form of the invention, it is possible to introduce the aqueous silicate solution into the acrylamide and formaldehyde aqueous solution containing a polymerization activating agent, then to add with stirring the calculated quantities of amide polymerization catalyst and silicate gelling reagent.

According to another form of the invention, the desired quantities of polymerization catalyst are incorporated into the two separately prepared mixtures of the silicate aqueous solution containing its gelling reagent and the acrylic aqueous solution containing its polymerization activating agent. After stirring for some minutes the injection is made in the soil according to the known techniques.

The respective alkaline silicate and acrylamide+formaldehyde proportions in the mixtures ready to be injected into the soil according to the invention may vary between large limits. For example, it is particularly advantageous to use 0.5 to 10 parts—and more particularly 1 to 5 parts (weight)—of alkaline silicate (expressed in dry extract) for each part by weight of the acrylamide-formaldehyde component (expressed in dry extract).

The constituents of the mixture according to the invention are used in aqueous solution form, the resulting mass to be injected including, for example, 5 to 15% by weight of silicate, gelling reagent, acrylic mixture, catalyst and activating agent. Under these conditions the mixtures to be injected have a very reduced viscosity, usually lower than 5 centipoises, and often near that of water. Thus the mixtures are easily handled when introduced in the soil to be consolidated.

The compositions of the invention have, according to the constituent respective proportions, hardening or gelling times which may vary between 1 minute and 1 hour and yield either elastic gels, or plastic gels having a better resistance to sinking, or hard gels, the sinking resistance of which is greater than 10 kg./cm.$^2$. In every case the obtained gels and plastic or hard masses do not show any syneresis phenomenon and are absolutely insensitive to water.

The mixture ratios to be used, according to the invention, with respect to the soil to be treated, are variable according to the type of soil, whether sandy, clay-like, etc. However, the ratios are generally between 10 and 60% of gelling material with regard to the weight of the soil to be strengthened, i.e. about 1 to 10% calculated by weight of constituent dry extract according to the invention. The soils, injected with these compositions have a very great cohesion, even when grounds with very fine materials, such as clay, are concerned. Moreover, they have an exceptional water resistance.

The following examples, cited merely in an illustrative way, show how the invention may be practiced.

EXAMPLES 1 TO 5

Mixtures have been prepared simultaneously as follows:

(a) A sodium silicate aqueous solution containing a gelling reagent, obtained by dissolving 6.5 g. of triacetin in 112.5 g. of water and 80 g. of sodium silicate at 33.6 Baumé degrees (i.e. 30.5% of dry extract), with a molecular ratio $SiO_2/Na_2O=3.9$.

This aqueous solution was changed into a gel in about 30 minutes and had a sinking resistance of 5 kg./cm.$^2$ after a 48 hour aging.

(b) An acrylic monomer aqueous solution containing a catalyst obtained by dissolving 0.5 g. of potassium persulfate and 0.4 g. of dimethylaminoproportionitrile in 200 g. of an aqueous solution including 10% by weight (dry extract) of a reaction mixture of 1 mole of formaldehyde and 2 moles of acrylamide (pH=6 to 8, aqueous solution viscosity: 2 centipoises at 20° C.).

This aqueous solution gave, after 5 to 6 minutes, an elastic gel for which it was impossible to measure the sinking resistance.

Just after their preparation, the two above solutions were mixed with stirring for 1 to 2 minutes (agitator speed: 400 runs/minute). Then the gelling time and the gel characteristics obtained have been evaluated.

The following table shows the results obtained by variation of the silicate constituent proportions (mixture (a) above) with regard to the constant proportions of the acrylic constituent (quantities indicated in (b)).

When the compositions of the Examples 3 and 4 were injected into a clay-like soil, according to the invention, just after their preparation, and in the proportion of 25 to 30% of aqueous solution (i.e. 3 to 4% of total dry extract) with regard to the soil weight in the part to be consolidated, a solid and hard mass resistant to erosion and able to bear heavy loads was obtained throughout the entire depth of the treated soil.

EXAMPLES 6 TO 8

These examples show the influence of the silicate gelling reagent proportions with regard to the total weight of acrylic and silicate solutions.

To mixtures prepared of:

100 g. of aqueous acrylic solutions with 10% of dry extract (acrylamide+formaldehyde) including 0.5 g. of potassium persulfate and 0.4 g. of diethylaminopropionitrile.

80 g. of sodium silicate at 33.6° Bé. (molecular ratio $SiO_2/Na_2O=3.9$)

100 g. of water

There was incorporated with stirring, for 3 minutes, triacetin in increasing proportions. The obtained product characteristics were as follows:

|  | G. |
|---|---|
| Triacetin: very elastic gel | 2.5–5 |
| Triacetin: plastic gel | 5–10 |
| Triacetin: hard but plastic gel | 10–15 |

The results obtained were similar to those obtained when sodium bicarbonate was substituted for triacetin.

The gel properties change equally when, all other constituent proportions being the same, the amount of catalyst or of the association catalyst+activating agent used for polymerizing in situ the acrylic monomer or monomers, is varied.

What is claimed is:

1. A process for conditioning soil comprising admixing said soil with a composition which is a mixture of:
   - an aqueous solution of an alkali metal silicate having an $SiO_2/M_2O$ molar ratio of 2–5 where M is K or Na and 10–80% by weight based on the weight of said silicate of a gelling agent,
   - an aqueous solution of 1–20% by weight of the reaction product of 0.5 to 1.5 moles of formaldehyde and 1 mol acrylamide, wherein the proportions of the silicate to the formaldehyde-acrylamide reaction product lies between 0.5 to 10 parts by weight of silicate for each part by weight of formaldehyde-acrylamide reaction product,
   - and a catalyst capable of causing the polymerization of the formaldehyde-acrylamide reaction product.

2. A process according to claim 1 wherein the gelling agent is selected from the group consisting of triacetin, sodium bicarbonate and ethyl acetate.

3. A process according to claim 1 wherein the catalyst is a mixture of a persalt and an aliphatic aminonitrile.

4. A composition for use as a soil conditioner comprising a mixture of:
   (1) an aqueous solution of an alkali metal silicate having an $SiO_2/M_2O$ molar ratio of 2–5 where M is K or Na and 10–80% by weight based on the weight of said silicate of a gelling agent;

| Example No. | Silicate solution (weight in g.) | | | Mixture properties | | |
|---|---|---|---|---|---|---|
|  | Silicate at 33.6° B. | Water | Gelling agent | Gelling time (minutes) | Gel characteristics | Minimal sinking resistance (kg./cm.$^2$) |
| 1 | 80 | 112.5 | 6.5 | 6–7 | Very elastic | |
| 2 | 160 | 225 | 13 | 18–20 | Elastic | 2 |
| 3 | 240 | 337.5 | 19.5 | 25–30 | Plastic | 5 |
| 4 | 320 | 450 | 26 | 25–30 | Hard | 6 |
| 5 | 400 | 562.5 | 32.5 | 30–35 | Very hard | 10 |

(2) an aqueous solution of 1–20% by weight of the reaction product of 0.5–1.5 mols of formaldehyde and 1 mol acrylamide, the proportion of silicate to the formaldehyde-acrylamide reaction product being between 0.5 and 10 parts by weight of silicate for each part by weight of formaldehyde-acrylamide reaction product; and (3) a catalyst for the polymerization of said formaldehyde-acrylamide reaction product.

5. A composition according to claim 4 wherein said gelling agent is selected from the group consisting of triacetin, sodium bicarbonate and ethylacetate; and wherein said catalyst is persalt.

References Cited

UNITED STATES PATENTS

| 2,652,381 | 9/1953 | Basoekis. |
| 3,135,029 | 6/1964 | Cooper et al. |
| 3,223,163 | 12/1965 | Koch et al. |

FOREIGN PATENTS

| 551,863 | 1/1958 | Canada. |

SAMUEL H. BLECH, *Primary Examiner.*

J. C. BLEUTGE, *Assistant Examiner.*

U.S. Cl. X.R.

166—33; 252—8.55; 260—29.6, 39, 41; 299—11